US010245709B2

(12) United States Patent
Takabu

(10) Patent No.: US 10,245,709 B2
(45) Date of Patent: Apr. 2, 2019

(54) GRIPPING TOOL

(71) Applicant: KABUSHIKI KAISYA LEBEN HANBAI, Kanagawa (JP)

(72) Inventor: Atsushi Takabu, Kanagawa (JP)

(73) Assignee: KABUSHIKI KAISYA LEBEN HANBAI, Kanagawa (JP)

( * ) Notice: Subject to any disclaimer, the term of this patent is extended or adjusted under 35 U.S.C. 154(b) by 184 days.

(21) Appl. No.: 15/522,514

(22) PCT Filed: Oct. 27, 2015

(86) PCT No.: PCT/JP2015/080247
§ 371 (c)(1),
(2) Date: Apr. 27, 2017

(87) PCT Pub. No.: WO2016/068133
PCT Pub. Date: May 6, 2016

(65) Prior Publication Data
US 2018/0290268 A1 Oct. 11, 2018

(30) Foreign Application Priority Data
Oct. 28, 2014 (JP) .............................. 2014-005720 U

(51) Int. Cl.
*B25B 7/18* (2006.01)
*B25B 7/02* (2006.01)
(Continued)

(52) U.S. Cl.
CPC ................ *B25B 7/18* (2013.01); *B25B 7/02* (2013.01); *B25B 7/08* (2013.01); *B25G 1/102* (2013.01); *H02G 1/00* (2013.01)

(58) Field of Classification Search
CPC ......... A01B 1/18; E21B 11/005; E21B 31/12; G01B 3/18; G01B 3/166; B25B 7/18;
(Continued)

(56) References Cited

U.S. PATENT DOCUMENTS 437,466 A * 9/1890 Vogel ........................ A01B 1/18
294/50.8
5,007,313 A 4/1991 Jeromson, Jr. et al.
(Continued)

FOREIGN PATENT DOCUMENTS

JP U1985-36176 3/1985
JP 1-97573 A 4/1989
(Continued)

OTHER PUBLICATIONS

International Search Report and Written Opinion; International Patent Application No. PCT/JP2015/080247, dated Nov. 24, 2015, with English translation of search report (10 pages).

*Primary Examiner* — Monica S Carter
*Assistant Examiner* — Makena S Markman
(74) *Attorney, Agent, or Firm* — Hamre, Schumann, Mueller & Larson, P.C.

(57) ABSTRACT

Provided is a nipping tool with which it is possible to nip an object, such as a cable, appropriately in accordance with the thickness or size of the object. This nipping tool is a nipping tool in which two members, each including a grip part and an operation part, are rotatably connected, and the operation parts open and close in association with the opening/closing of the grip parts. The grip part has a plurality of holding positions. The shape of the grip part is such that the degree of opening of the operation parts differs when the two members are closed together using the various holding positions.

3 Claims, 10 Drawing Sheets

(51) Int. Cl.
*B25B 7/08* (2006.01)
*B25G 1/10* (2006.01)
*H02G 1/00* (2006.01)

(58) Field of Classification Search
CPC .... B25B 7/10; B25B 7/12; B25B 7/02; B25B 7/08; B25G 1/04; B25G 1/10; B25G 1/102; H02G 1/00
USPC ............. 81/34, 415, 427.5, 489; 294/86.24, 294/86.29, 86.32
See application file for complete search history.

(56) References Cited

U.S. PATENT DOCUMENTS

| | | | |
|---|---|---|---|
| 6,513,198 B2* | 2/2003 | Lu ........................... | B25G 1/12 16/421 |
| 8,707,833 B1* | 4/2014 | Gedeon .................... | B25B 7/04 81/414 |
| 9,662,130 B2* | 5/2017 | Bartels .................... | A61B 17/2816 |
| 2013/0185945 A1* | 7/2013 | Wang ....................... | B25G 1/04 30/341 |

FOREIGN PATENT DOCUMENTS

| | | |
|---|---|---|
| JP | 7-241777 A | 9/1995 |
| JP | 2013-236494 A | 11/2013 |

\* cited by examiner (a)

(b)

(c)

(a)

(b)

(c)

(a)

(b)

(a)

(b)

(a)

(b)

(a)

(b)

(c)

(d)

(a)

(b)

GRIPPING TOOL

TECHNICAL FIELD

The present invention relates to a gripping tool.

BACKGROUND ART

There often are many cables in a facility in which servers, routers, and the like are integrated. The cables are handled mainly by human hands.

Note that the indirect live wire grasping tool disclosed in Patent Document 1 "includes: a pair of gripping pieces which are rotatable, about a connecting pin in a direction in which the gripping pieces comes in contact and get apart; and a pair of insulating rods which are each connected to a base end part of each of the gripping pieces."

CITATION LIST

Patent Literature

Patent Literature 1: JP 2013-236494 A

SUMMARY OF INVENTION

Technical Problem

In the above facility having servers, router, and the like, cables are often densely packed, and the cables are connected with connectors; therefore, when working with human hands, in some cases, a cable is damaged, an unintended cable is pulled out, and a connector is damaged. In particular, in recent years, the above equipment has high performance, increased speed, and reduced size, and is delicate; therefore, more careful work is required.

For example, when the following works are done, more careful and precise work is required: setting work using DIP switches and the like in association with installation of additional equipment, version-up work of equipment, updating work of memory boards, and removal of bolts and check for loose bolts for maintenance and check work. At that time, if the facility is small or if wind from a cooling device is not appropriate, it is a large burden for a worker to handle a predetermined cable in densely packed cables.

Even if common pliers or the like are used, for example, for handling work such as plugging and unplugging of tangled cables, it is difficult to adjust force applied to a grasping part; and if the grasping part is grasped too strongly, a cable is damaged or cut in some cases.

Also in the case of the above-described indirect live wire grasping tool according to Patent Document 1, it is difficult to adjust force applied to the grasping part in the same way as in the case of conventional pliers.

The present invention provides a gripping tool which can appropriately grip an object, depending on the thickness and size of the object such as a cable.

Solution to Problem

To solve the above problem, a gripping tool according to the present invention includes: two members, each of the members having a grasping part and an acting part, wherein the members are rotatably connected to each other, the acting parts are opened and closed in association with opening and closing of the grasping parts, the grasping part has a plurality of grasping positions, and the grasping part is formed in such a shape that, when the two members are closed at the respective grasping positions, a degree of opening of the acting parts is different among the grasping positions.

Further, a shape of the grasping part may be a step shape which is formed to have different widths.

Further, the shape of the grasping part may be a step-like shape of which width becomes wider step by step in a direction from the acting part toward the grasping part.

Further, the shape of the grasping part may be a step-like shape of which width becomes wider step by step in a direction from the grasping part toward the acting part.

Further, the acting parts may be configured such that a degree of opening is narrower when the two members are closed at a wider grasping position of the grasping parts.

Further, on each of the step shapes, a value indicating a degree of opening of the acting parts may be displayed.

Further, the gripping tool may include a resilient body which biases the acting parts in a direction in which the acting parts are closed, wherein when the grasping parts are closed, the acting parts may be opened.

Further, each of the two members maybe made up of a resilient member.

Further, the gripping tool may include a connection part which connects the acting part and the grasping part, wherein a length of the connection part may be adjustable.

Further, the acting parts may be in an approximate ring shape.

Further, the acting parts may be in an approximate ring shape, one of the two members constituting the acting parts may include a protrusion of which tip is bent, outward from the approximate ring shape, in a hook shape, and the other of the two members constituting the acting parts may include a protrusion projecting outward from the approximate ring shape.

Further, the acting parts may be detachable from the gripping tool.

Further, the acting parts may include, in at least one of the member, a recessed part in which an object is approximately fit.

Advantageous Effects of Invention

According to the present invention, it is possible to provide a gripping tool which can appropriately grip an object, depending on the thickness and size of the object such as a cable.

DESCRIPTION OF EMBODIMENTS (First Embodiment)

Figure 1:
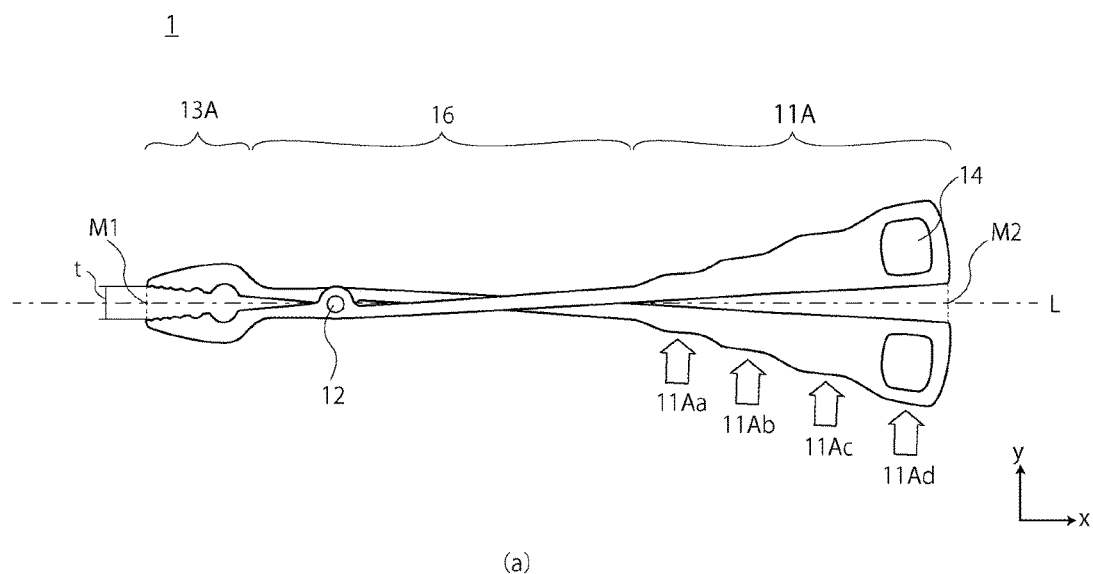
FIGS. 1(a) to 1(c) are diagrams each showing an outer appearance of a gripping tool in a first embodiment.
Figure 1:
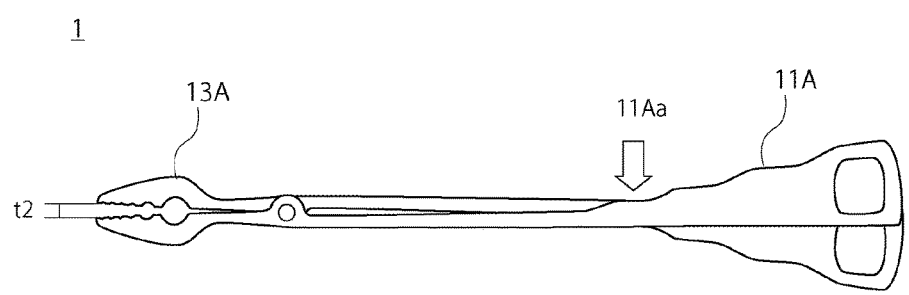
Figure 1:
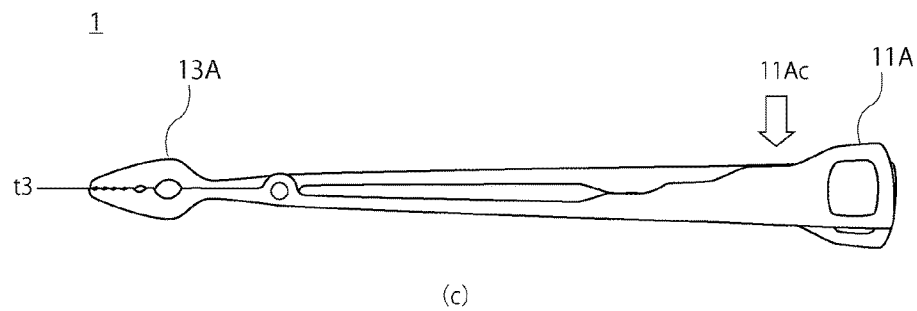

Hereinafter, on the basis of the drawings, an embodiment of the present invention will be described. FIGS. 1(*a*) to 1(*c*) are diagrams each showing an outer appearance of a gripping tool 1 in a first embodiment.

FIG. 1(*a*) is a front view of the gripping tool 1 in the first embodiment. The gripping tool 1 is configured with two members which are a pair and rotatably engaged with each other by an engagement part 12. The gripping tool 1 includes grasping parts 11A, connection parts 16, and acting parts 13A. The gripping tool 1 may further include holes 14. When the grasping parts 11A are operated, the respective members rotate about the engagement part 12 as a pivot point in association with opening and closing of the grasping parts 11A, whereby the acting parts 13A are opened and closed.

With respect to the gripping tool 1 shown in FIG. 1(*a*), the distance between the tips of the respective members constituting the acting parts 13A is represented by t. When the grasping parts 11A are grasped and operated so as to close the grasping parts 11A, the distance t gradually decreases. To the contrary, when an operation is performed to open the grasping parts 11A, the distance t gradually increases. Note that the gripping tool 1 may include a resilient member such as a spring to bias the grasping parts 11A in the direction to open the grasping parts 11A.

The grasping parts 11A each include a plurality of steps, and each step represents a grasping position when grasping. When assuming as a central axis L the line segment connecting the midpoint M1 between the tip and tip, on the acting parts 13A side, of the two members constituting the gripping tool 1, the midpoint M2 between the tip and tip, on the grasping parts 11A side, of the two members, and the engagement part 12, the steps are configured such that the steps are becoming closer to the central axis L in the direction from the tips of the grasping parts 11A to the acting parts 13A. In other words, when the y-axis direction, in the front view, of the grasping parts 11A is defined as a width, the grasping parts 11A each have a step-like shape in which the width increases step by step in the direction from the engagement part 12 to the grasping part 11A. The grasping parts 11A each include, as the grasping position, the parts which are in step-like shape and are approximately parallel to the central axis L. Note that, in the grasping parts 11A of the gripping tool 1 shown in FIG. 1(*a*), although the pair of members constituting the grasping parts 11A each includes steps, only one of the members may include steps. In the present embodiment, a description will be given on the gripping tool 1 in which both of the members include steps.

When the grasping parts 11A are grasped, a step belonging to one member and the step of the other member at the position opposed to the step of the one member are grasped. By applying force to the both steps, the finger grasping the step comes in contact with the other member, and it is thus impossible to apply more force. At this time, the principle of lever works in the gripping tool 1, where the engagement part 12 works as a pivot point, the steps works as points of effort, and the acting parts 13A work as points of action; therefore, larger force acts on the acting parts 13A, as force is applied to the step more distant from the engagement part 12 as the pivot point. Specifically, when the steps closer to the tips on the grasping parts 11A side of the gripping tool 1, in other words, the wider steps are grasped, the distance t between the members constituting the acting parts 13A is smaller.

In other words, when the grasping parts 11A are grasped at the respective grasping positions, the degree of opening of the acting parts 13A is varied from one step to another.

Note that the gripping tool 1 shown in FIG. 1(*a*) includes four steps as the grasping position. The narrowest step is represented by a step 11Aa, the next narrowest step is represented by a step 11Ab, the further next narrowest step is represented by a step 11Ac, and the widest step is represented by a step 11Ad.

The tips of the respective members constituting the acting parts 13A have contact surfaces which come in contact with an object when the acting parts 13A are closed, and the object is sandwiched by the respective contact surfaces, so that the object can be stably supported. As shown in FIG. 1(*c*), when the acting parts 13A are closed, there may be generated a gap between the members, at a part except the contact surfaces of the members constituting the acting parts 13A.

By inserting fingers in the holes 14 equipped in the grasping parts 11A and opening the grasping parts 11A, the acting parts 13A can be opened wider.

The gripping tool 1 is made of resilient members, for example. The gripping tool 1 is made of synthetic resin such as nylon resin or elastomer. Note that the gripping tool 1 may be formed of compound of nylon resin, silicon, elastomer resin, or the like. Alternatively, the gripping tool 1 may be made of wood or metal. Instead, the gripping tool 1 may be made of different materials, for example, the engagement part 12 is made of metal, and the other part is made of resin.

FIG. 1(*b*) shows the gripping tool 1 when the steps 11Aa are grasped. The distance t2 when the steps 11Aa are grasped is smaller than the distance t in FIG. 1(*a*) when the grasping parts 11A are open. Note that each of the fingers grasping steps 11Aa (for example, an index finger and a thumb) is in contact with each of the other members; therefore, more force cannot be applied by the fingers, and the acting parts 13A are fixed while having a gap of the distance t2.

Further, when the two members are closed at the grasping position as shown in FIG. 1(*b*), the two members constituting the grasping parts 11A overlap each other. At this time, the overlapping surfaces are parallel to the plane defined by rotation of the two members.

FIG. 1(*c*) shows the gripping tool 1 when the steps 11Ac are grasped. The distance t3 when the steps 11Ac are grasped has a numerical value extremely close to 0. As a matter of course, the distance t3 is smaller than the distance t2 when the steps 11Aa are grasped. That is because the steps 11Ac have wider widths than the steps 11Aa and the steps 11Ac thus act on the members constituting the acting parts 13A more largely.

Note that the distance t when the steps 11Ab are grasped is smaller than the distance t2 and greater than the distance t3. In the state that the steps 11Ab are grasped, this distance t is fixed.

Further, in the case that the gripping tool 1 is configured with resilient members, when the two members are closed at the grasping positions of the steps 11Ad, the acting parts 13A are not only closed but pressure is applied in the direction of further pressing each member.

Note that in FIG. 1 the shapes of the opposing acting parts 13A are illustrated to be identical; however, the shapes and the material of the acting parts 13A may be different. FIG.

1 shows that the acting parts 13A are opposed symmetrically with respect to the axis center; however, the acting parts 13A do not have to be symmetric.

The gripping tool 1 in the present embodiment is useful for servers, routers, and the like in which many cables are packed. A user grips, for example, a LAN (Local Area Network) connector plugged to a router with the acting parts 13A and applies force to the grasping parts 11A. Then, a claw equipped on the connector is pressed by the acting part 13A, and the user thus can unplug the cable. By adjusting the thicknesses and the widths of the members constituting the acting parts 13A, handling can be more delicate even when handling the cables packed in a small space.

In addition, because the gripping tool 1 is made up of resilient members, it is prevented that excessive force is applied to the acting parts 13A. For example, even if the acting parts 13A grip an object larger than the distance t, the members constituting the gripping tool 1 bend, so that the force applied to the acting parts 13A is adjusted.

This feature is useful when an object should be gripped with stronger force on the acting parts 13A. Further, if an object is thin or narrow like paper, thread, and the like, the object can be gripped more appropriately.

Further, with regard to the gripping tool 1, because it is possible to adjust the gap of the acting parts 13A, depending on the position at which the steps of the grasping parts 11A are grasped, the force applied to an object can be adjusted by adjusting the grasping position, depending on the thickness and the width of the object to be handled. Further, because the gap of the acting parts 13A can be fixed, it is possible to prevent unexpected force from being applied to an object and the object to be thus damaged. That is, the object can be gripped appropriately.

(Modified Example)

Figure 2:
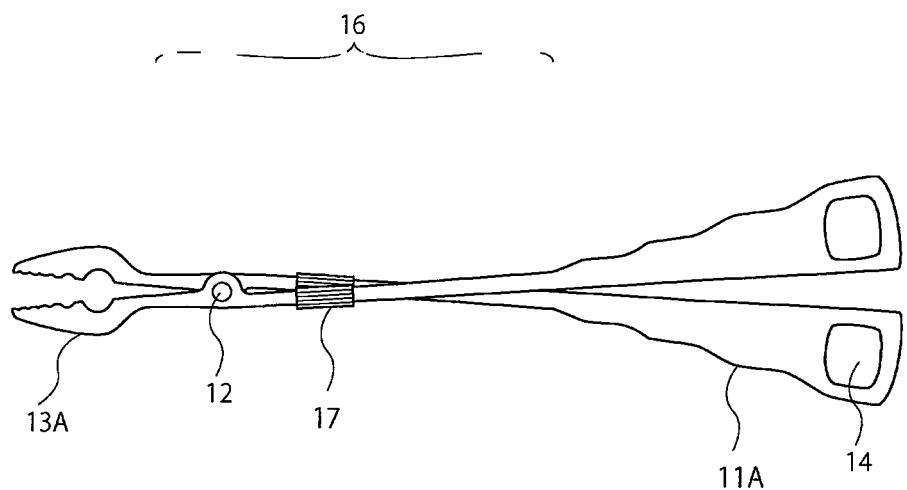
FIG. 2 is a diagram showing an outer appearance of a gripping tool in a modified example of the first embodiment.

Next, a modified example of the first embodiment will be described. FIG. 2 is a diagram showing an outer appearance of a gripping tool 1 in the modified example of the first embodiment. Hereinafter, a description will be given on the points which are different from those in the above embodiment.

In the gripping tool 1 in the present modified example, connection parts 16 include joint members 17. Each of the members constituting the gripping tool 1 is made up of two parts, one of which is a part having a grasping part 11A and the other of which is a part having an acting part 13A, and these two parts are connected by the joint member 17.

The joint member 17 is provided on each of the members and rotates in the direction of wrapping around the member. The joint member 17 is loosened to expand or contract the connection part 16. Alternatively, the joint member 17 is tightened to fix the connection part 16. Because this operation changes the distance between the grasping parts 11A and the acting parts 13A, it is possible to adjust how much force is applied to an object on the acting parts 13A.

(Second Embodiment)

Figure 3:
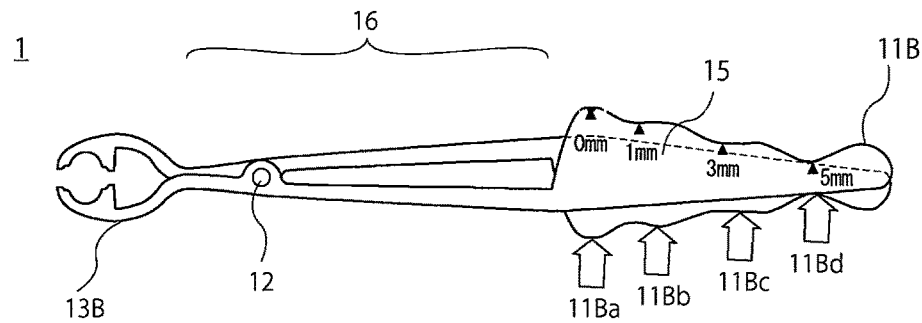
FIGS. 3(a) to 3(c) are diagrams each showing an outer appearance of a gripping tool in a second embodiment.
Figure 3:
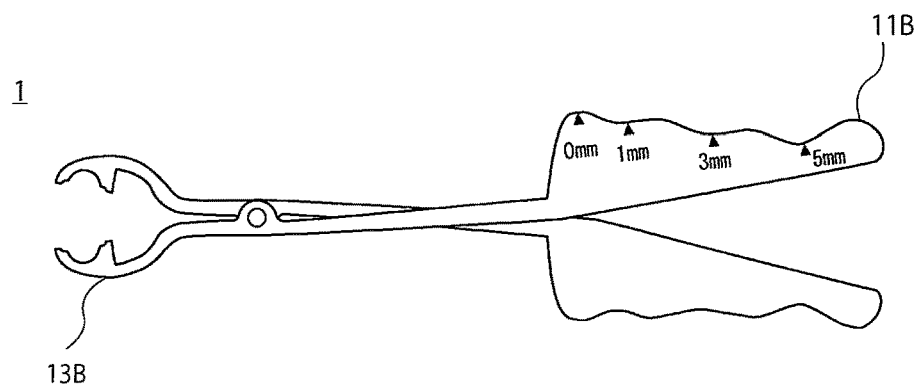
Figure 3:
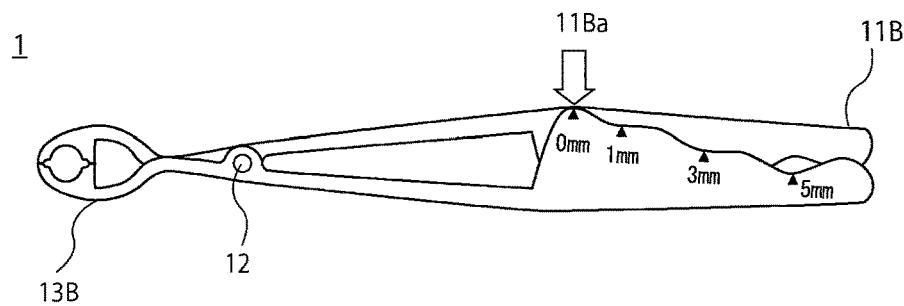

Next, a second embodiment will be described. Hereinafter, a description will be given on the points which are different from those in the first embodiment. FIGS. 3(a) to 3(c) are diagrams each showing an outer appearance of a gripping tool 1 in the second embodiment. Hereinafter, a description will be given on the points which are different from those in the above embodiment.

FIG. 3(a) is a front view of the gripping tool 1 in the second embodiment. The gripping tool 1 in the second embodiment includes grasping parts 11B, acting parts 13B, and scale marks 15.

The grasping parts 11B each have a step-like shape whose width becomes wider step by step in the direction from the tip of the grasping part 11B toward the acting part 13B. The gripping tool 1 shown in FIG. 3(a) includes four steps as grasping positions. The steps are represented by, in order from the widest step, a step 11Ba, a step 11Bb, a step 11Bc, and a step 11Bd.

Each scale mark 15 is given to each grasping position. The scale marks 15 each show a value indicating a degree of opening of the acting parts 13B. The scale marks 15 are each, for example, a value roughly indicating the distance t between the tips of the members constituting the acting parts 13B when the grasping position is grasped. In FIG. 3(a), "0 mm" is given to the step 11Ba as the scale mark 15, "1 mm" to the step 11Bb as the scale mark 15, "3 mm" to the step 11Bc as the scale mark 15, and "5 mm" to the step 11Bd as the scale mark 15.

FIG. 3(a) shows the gripping tool 1 when the steps 11Bd are grasped. Because "5 mm" is given to the step 11Bd as the scale mark 15, the gap between the tips of the acting parts 13B is approximately 5 mm. Note that the scale marks 15 are not limited to the values indicating the distance t, and may be serial numbers, for example.

When the grasped steps of the grasping parts 11B are closer to the acting parts 13B, the distance t between the members constituting the acting parts 13B is smaller. The first embodiment and the present embodiment have something in common in that when the wider steps are grasped, the distance t defined by the tips of the acting parts 13A becomes smaller.

FIG. 3(b) shows the gripping tool 1 when the acting parts 13B are opened. When each of the members constituting the grasping parts 11B is rotated in the direction toward the step shape of each member, the acting parts 13B becomes open.

FIG. 3(c) is the gripping tool 1 when the steps 11Ba are grasped. Because the scale mark 15 of "0 mm" is assigned to the step 11Ba, the distance t is approximately "0 mm," and the acting parts 13B are almost closed.

Figure 4:
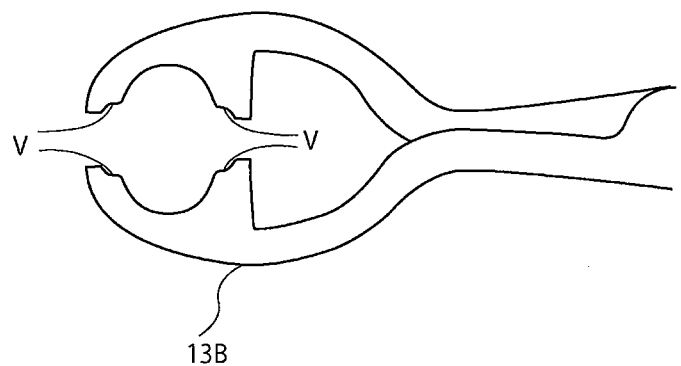
FIGS. 4(a) and 4(b) are diagrams each showing details of the gripping tool of the second embodiment.
Figure 4:
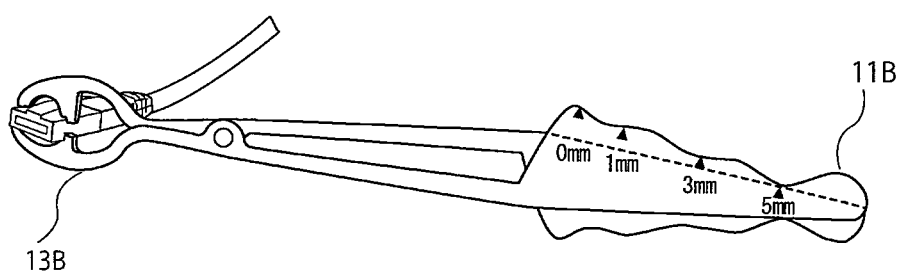

FIGS. 4(a) and 4(b) are diagrams showing in detail the gripping tool 1 in the second embodiment. FIG. 4(a) is an enlarged view of the acting parts 13B of the gripping tool 1 in the present embodiment. With regard to the acting parts 13B, each of the members constituting the acting parts 13B has two recessed parts v which are recessed by an angle of approximately 90 degrees. The recessed parts v are provided at the positions at which an object is approximately fit when the object is gripped by the acting parts 13B. The acting parts 13B shown in FIG. 4(a) have the recessed parts v provided at the positions at which a LAN cable can be gripped as an object.

FIG. 4(b) shows the gripping tool 1 when a LAN cable is gripped between the acting parts 13B. Because the LAN cable is approximately fit in the recessed parts v, the LAN cable is fixed with respect to the acting parts 13B, and the LAN cable can be more surely gripped.

(Third Embodiment)

Figure 5:
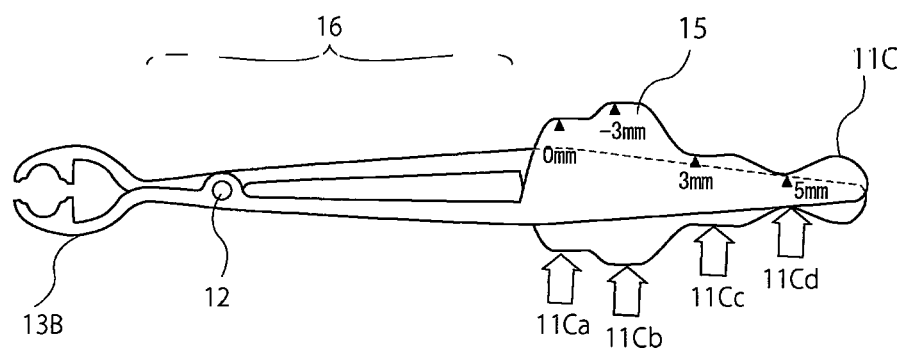
FIGS. 5(a) and 5(b) are diagrams each showing an outer appearance of a gripping tool in the third embodiment.
Figure 5:
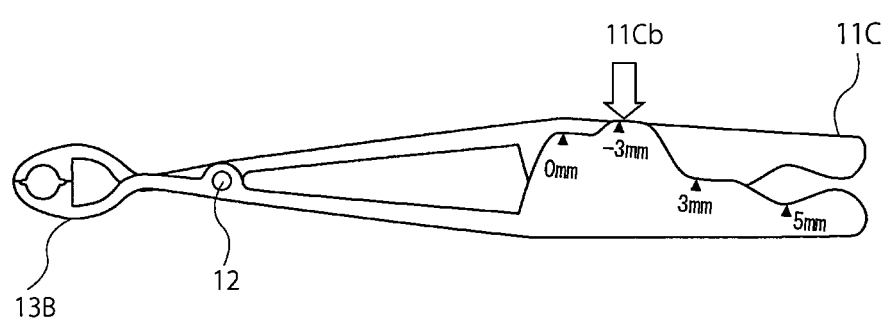

FIGS. 5(a) and 5(b) are diagrams each showing an outer appearance of a gripping tool 1 in a third embodiment. Hereinafter, a description will be given on the points which are different from those in the above embodiments. The gripping tool 1 in the present embodiment includes grasping parts 11C.

Each of the grasping parts 11C includes a grasping position in a step shape with different widths, and the grasping position is different from those in the above embodiments in that the grasping position is not in the step-like shape of which width gradually becomes wider (or narrower) in the direction from one end of the grasping part 11C toward the other end. The grasping parts 11C shown in FIG. 5(a) include as the grasping position a step 11Ca, a step 11Cb, a step 11Cc, and a step 11Cd. The step 11Cb is the widest step of the steps equipped in the grasping part 11C. Note that the gripping tool 1 shown in FIGS. 5(a) and 5(b) is configured such that the acting parts 13B are closed when the steps 11Ca are grasped. Note that the shapes of the grasping parts 11C and the acting parts 13B are not limited to those shown in FIGS. 5(a) and 5(b).

FIG. 5(b) shows the gripping tool 1 when the steps 11Cb are grasped. Because the steps 11Cb are wider than the steps 11Ca, when the step 11Cb are grasped, stronger load is applied to the acting parts 13B than when the steps 11Ca are grasped. Note that because the gripping tool 1 is made up of resilient members, the load is adjusted so as to prevent damage to an object to be gripped.

(Fourth Embodiment)

Figure 6:
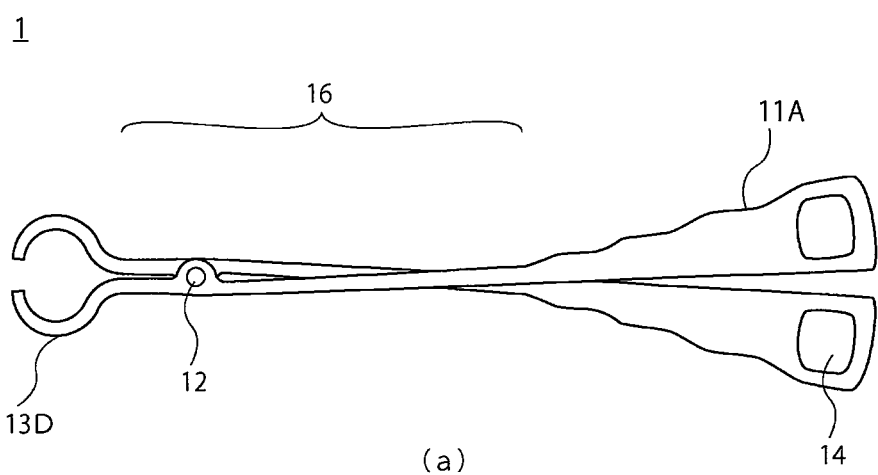
FIGS. 6(a) and 6(b) are diagrams each showing an outer appearance of a gripping tool in a fourth embodiment.
Figure 6:
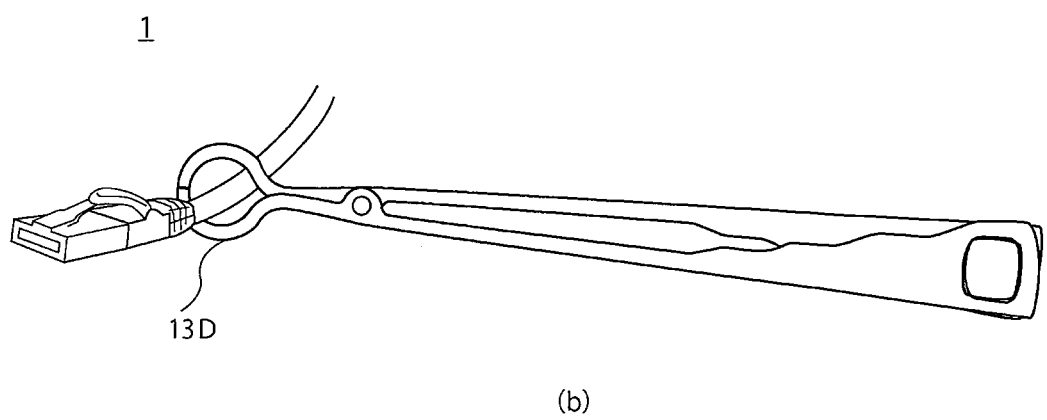

Next a fourth embodiment will be described. Hereinafter, a description will be given on the points which are different from those in the above embodiments. FIGS. 6(a) and 6(b) are diagrams each showing an outer appearance of a gripping tool 1 in the fourth embodiment.

FIG. 6(a) is a front view of the gripping tool 1 in the fourth embodiment. The gripping tool 1 in the fourth embodiment includes acting parts 13D. With regard to the acting parts 13D, a pair of members constituting the acting parts 13D forms an approximate ring shape.

In a similar way as in the above embodiments, by adjusting the positions of the steps to be grasped, it is possible to adjust the distance defined between the tips of the members configuring the acting parts 13D in an approximate ring shape. Because the acting parts 13D are in an approximate ring shape, the acting parts 13D are useful to guide, for example, an object to which a member, which is larger than the diameter of the acting parts 13D, is connected. FIG. 6(b) shows the state that a cable to which a connector, which is larger than the diameter of the acting parts 13D, is connected is guided. The gripping tool 1 according to the fourth embodiment is useful to retrieve a cable fallen in an unreachable gap, for example.

(First Modified Example)

Next, a first modified example of the fourth embodiment will be described. Hereinafter, a description will be given on the points which are different from those in the above embodiments. FIGS. 7(a) to 7(d) are diagrams each showing an outer appearance of the gripping tool 1 in the modified example of the fourth embodiment.

Figure 7:
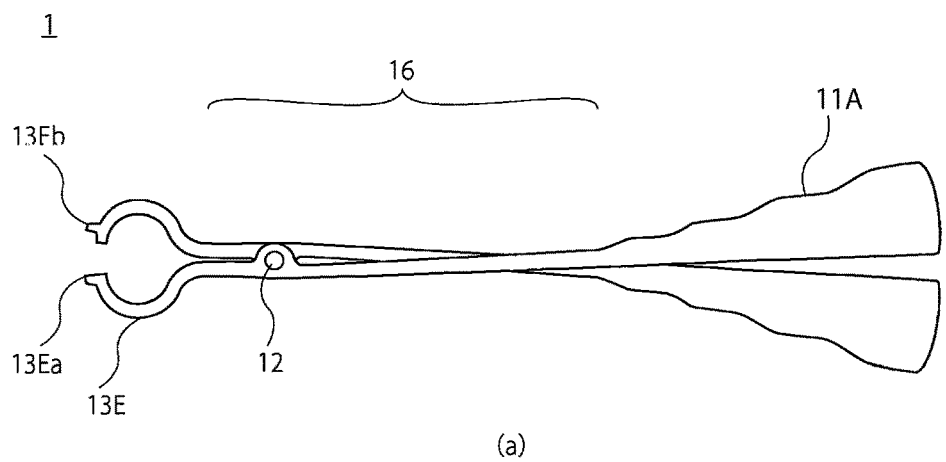
FIGS. 7(a) to 7(d) are diagrams each showing an outer appearance of a gripping tool in a modified example of the fourth embodiment.
Figure 7:
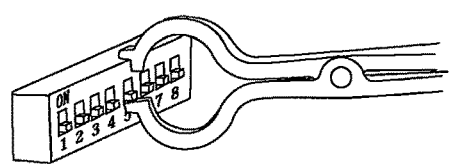
Figure 7:
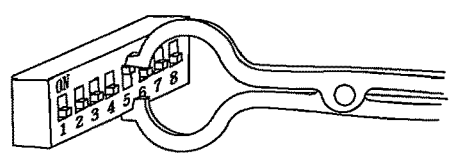
Figure 7:
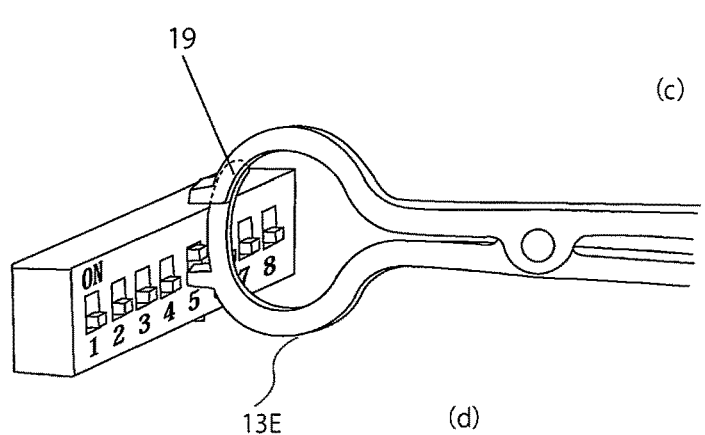

FIG. 7(a) is a front view of the gripping tool 1 in the present modified example. The gripping tool 1 in the present modified example includes acting parts 13E. The acting parts 13E includes a protrusion 13Ea and a protrusion 13Eb each provided, on each of the members constituting the acting parts 13E, to protrude outward from the approximate ring shape.

The protrusion 13Ea and the protrusion 13Eb preferably protrude in the direction to be opposed to the engagement part 12. In other words, when assuming the engagement part 12 direction to be the back side and the acting parts 13E side to be the ventral side in the state that the acting parts 13E are closed, it is preferable that the protrusion 13Ea and the protrusion 13Eb protrude on the ventral side.

The protrusion 13Ea has a shape in which the tip of one member of the acting parts 13E is bent, outward from the approximate ring shape, in a hook shape. In other words, the protrusion 13Ea is made by bending outward the tip of the member by about 90 degrees. On the other hand, the tip of the member having the protrusion 13Eb is not bent in a hook shape. The protrusion 13Eb protrudes, outward from the approximate ring shape, in a protruding shape by an angle of 90 degrees at a position except the tip of the member.

FIG. 7(b) is a diagram showing an example of a use state of the present modified example. The gripping tool 1 in the present modified example is used to operate a DIP switch, for example. FIG. 7(b) shows the operation of pushing the DIP switch upward from below.

The protrusion 13Eb is caught on the upper surface of the case of the DIP switch. At this time, because the edge of the DIP switch case is caught on a recessed part with an angle of approximately 90 degrees made between the tip of the member, of the acting part 13E, having the protrusion 13Eb and the protrusion 13Eb, the operation of the grasping parts 11A can be stably performed.

On the other hand, the protrusion 13Ea is caught on the switch which is at the lower position before the operation. By operating the grasping parts 11A, the acting parts 13E are closed; however, because one of the members constituting the acting parts 13E is caught on the DIP switch case, and the member having the protrusion 13Ea moves about the engagement part 12 as a pivot point and pushes up the switch. As a result, the DIP switch is pushed up from below.

FIG. 7(c) is a diagram showing another example of the present modified example. The diagram shows the situation in which the DIP switch is pushed down from up. The protrusion 13Eb is caught on the lower side edge of the DIP switch case. By operating the grasping parts 11A, the member of the acting part 13E having the protrusion 13Ea moves downward and pushes down the switch.

Not shown in the drawing here, however, the protrusion 13Ea and the protrusion 13Eb may be covered with or lapped with non-slip rubber material or may be made of flexible material.

(Second Modified Example)

FIG. 7(d) is a diagram showing an outer appearance of a gripping tool 1 in a second modified example. An acting part 13E in the present modified example has a guide part 19. The guide part 19 is made by extending one member to be in a ring shape such that the one member overlaps the other member. In the acting parts 13E of the present modified example, opening and closing of the grasping parts 11A does not open the guide part 19, but opens and closes the distance between the protrusion 13Ea and the protrusion 13Eb about the engagement part 12 as a pivot point. With this arrangement, for example, when operating a switch such as a DIP switch, the outer circumference of the guide part 19 plays a role of a guide, being in contact with an operation panel or the like. Further, being guided by the guide part 19, the protrusion 13Ea and the protrusion 13Eb are easily caught on the switch, so that the operation is supported. Note that, the other embodiments described above maybe provided with a guide part 19 similar to that in the present modified example.

The present embodiment enables stable operations of switches. In addition, when operating too small a switch to be operated by a human hand, the switch can be surely operated by using a gripping tool 1 of which size is appropriate to the switch.

(Fifth Embodiment)

Figure 8:
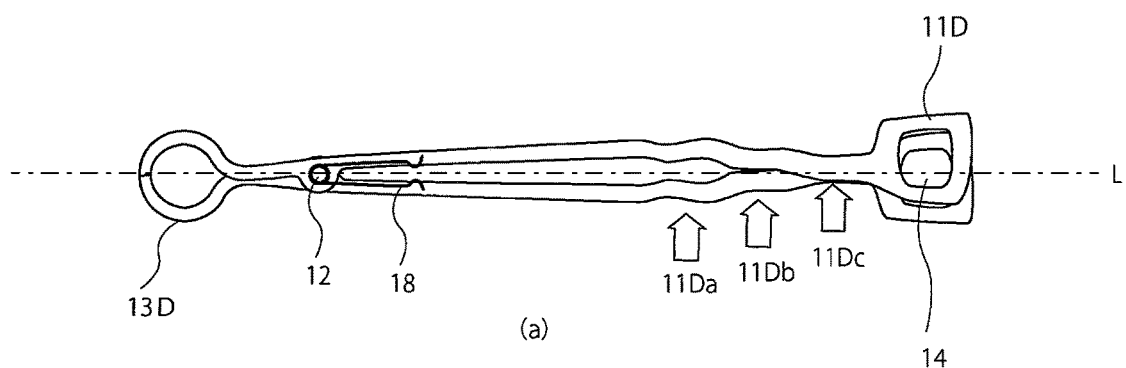
FIGS. 8(a) and 8(b) are diagrams each showing an outer appearance of a gripping tool in a fifth embodiment.
Figure 8:
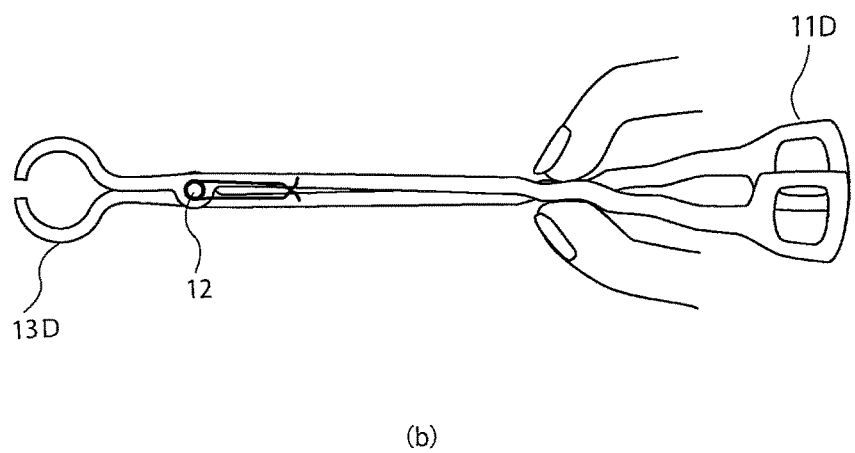

Next, a fifth embodiment will be described. FIGS. 8(a) and 8(b) are diagrams each showing an outer appearance of the gripping tool 1 in the fifth embodiment. The gripping tool 1 in the present embodiment includes grasping parts 11D and a resilient body 18. Further, although the gripping tool 1 shown in FIGS. 8(a) and 8(b) includes acting parts 13D, the shapes of the acting parts are not limited to these shapes.

Although the grasping parts 11D each have a plurality of steps as grasping positions, the width of the grasping parts 11D constituting the steps is approximately constant. The grasping parts 11D of the gripping tool 1 shown in FIG. 8(a) each have, in order from being away from the central axis L, a step 11Da, a step 11Db, and a step 11Dc. The resilient body 18 biases the acting parts 13D in the direction in which the acting parts 13D are closed. Note that although the steps 11Dc of the gripping tool 1 shown in FIG. 8(a), which are nearest from the central axis L, are closed in the state that the acting parts 13D are closed, no steps may be closed in the initial state that the acting parts 13D are closed.

In the gripping tool 1 in the present embodiment, when the grasping parts 11D are grasped, the acting parts 13D are opened. That is, when the steps are gripped in the direction in which the steps are closed, the acting parts 13D are opened. At this time, as the steps more distant from the central axis are grasped, the acting parts 13D are opened wider. FIG. 8(b) shows the gripping tool 1 when the steps 11Da are grasped. The acting parts 13D are opened. Note that when the steps 11Db are grasped, the degree of opening of the acting parts 13D is narrower than the degree of opening shown in FIG. 8(b) because the steps 11Db are closer to the central axis L than the steps 11Da.

In the present embodiment, because the acting parts 13D are closed without pressing of the grasping parts 11D, it is not necessary to grip the steps when moving the object while gripping the object; therefore, the present embodiment is useful. In addition, because the degree of opening depends on the steps being grasped, it is possible to adjust the degree of opening, depending on an object.

(Sixth Embodiment)

Figure 9:
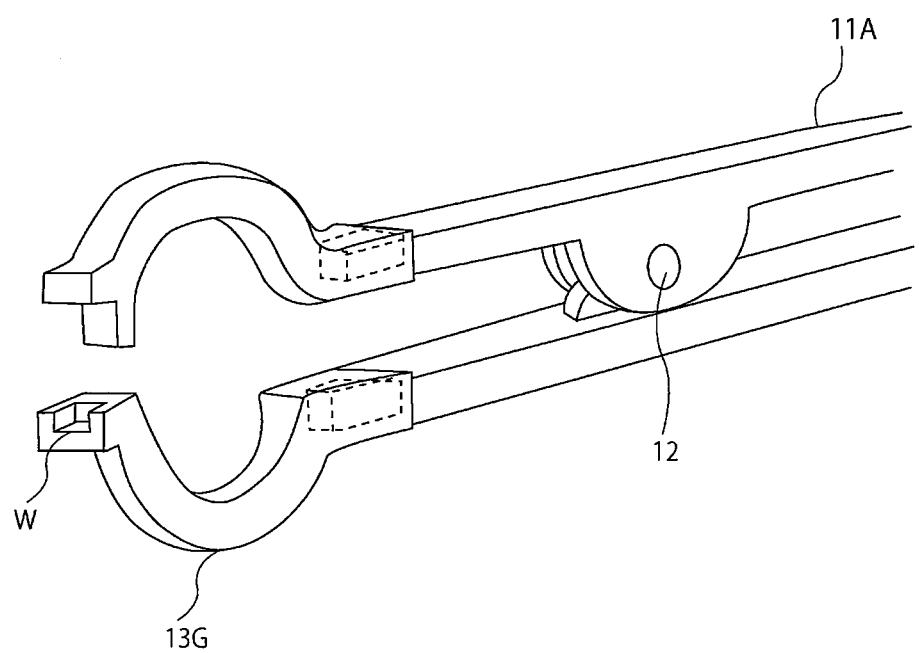
FIG. 9 is a diagram showing an outer appearance of acting parts in a sixth embodiment.

Next, a sixth embodiment will be described. FIG. 9 is a diagram showing an outer appearance of acting parts 13G in the sixth embodiment. Hereinafter, a description will be given on the points which are different from those in the above embodiments.

A gripping tool 1 in the sixth embodiment includes the acting parts 13G. The acting parts 13G are detachably connected to the gripping tool 1. The acting parts 13G shown in FIG. 9 are formed in an approximate ring shape in a similar way as in the above fourth embodiment. Instead, to the gripping tool 1 there may be connected acting parts 13A in shapes similar to those in the above first embodiment or the acting parts 13B in the second embodiment, for example. A user can select the acting parts 13G depending on purposes and can change the acting parts to use.

The acting parts 13G have a recessed part W in at least one of the members constituting the acting parts 13G.

For example, the recessed part has a size in which a switch conforming to a predetermined standard is fit. The recessed part W shown in FIG. 9 is so configured that a DIP switch fits in the recessed part W. With this arrangement, it is possible to more surely operate a switch conforming to a predetermined standard.

(Modified Example)

Figure 10:
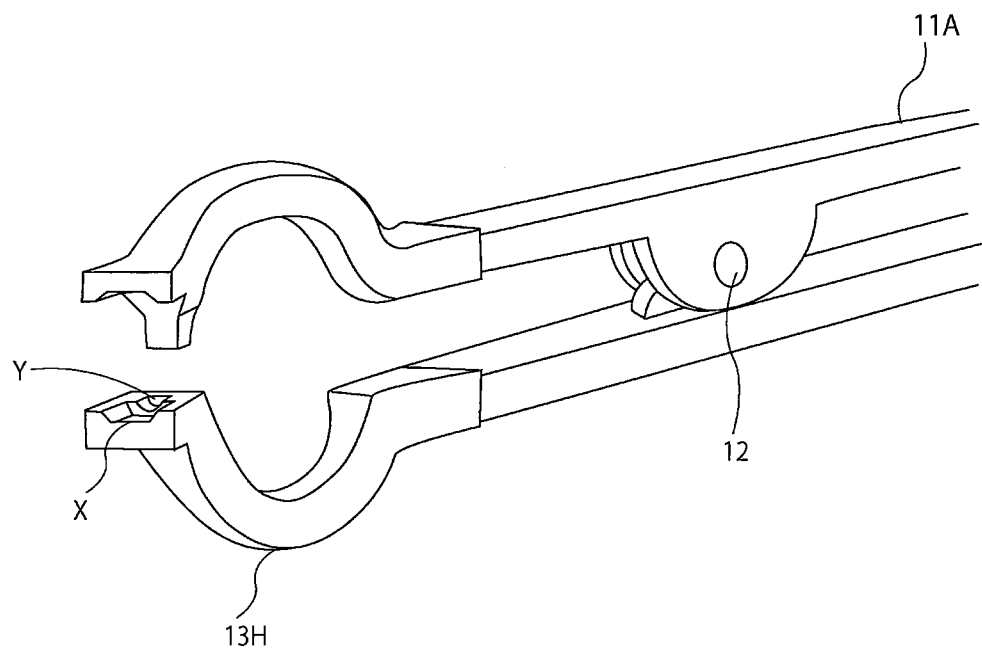
FIG. 10 is a diagram showing an outer appearance of acting parts in a modified example of the sixth embodiment.

Next, a modified example of the sixth embodiment will be described. FIG. 10 is a diagram showing an outer appearance of acting parts 13H in the modified example of the sixth embodiment. Hereinafter, a description will be given on the points which are different from those in the above embodiments.

A gripping tool 1 of the present modified example is configured to grip an object in an approximate hexagonal shape such as a hexagon nut. The gripping tool 1 includes the acting parts 13H. The acting parts 13H have, in at least one of the members, a recessed part X and a recessed part Y in which a hexagonal-shaped object is approximately fit. The recessed part Y is a recess for receiving a member such as a bolt, which is used in combination with the hexagon nut, when the hexagon nut is gripped in the recessed part X. That is, the bolt tip of the bolt penetrating the hexagon nut is prevented from being caught by the members constituting the acting parts 13H when the acting parts 13H are closed.

Note that the acting parts 13H may have a magnet body or have magnetism. The magnetized acting parts 13H prevent a bolt from falling off.

With the gripping tool 1 of the present modified example, a hexagon nut can be more surely screwed and unscrewed. Further, similarly to the above sixth embodiment, if the acting parts 13H in the present modified example are configured to be detachable from the gripping tool 1, an efficient work can be performed, depending on purposes.

The present invention is described on the basis of the respective embodiments in the above; however, the present invention is not limited to the requirements described in the above embodiments. The requirements described in the above embodiments can be modified without departing from the spirit of the present invention and can be appropriately set on the basis of an application form of the invention.

In addition, the features of the respective embodiments can be combined with one another. Anyone of the above gripping tools 1 may also have the feature of other embodiments.

REFERENCE SIGNS LIST

1: Gripping tool
11A: Grasping part
12: Engagement part
13A, 13D, 13E, 13F, 13G, 13H: Acting part
13Ea, 13Eb: Protrusion
14: Hole
15: Scale mark
16: Connection part
17: Joint member
18: Resilient body
19: Guide part

The invention claimed is:

1. A gripping tool comprising:
two members, each of the members having
  a grasping part; and
  an acting part,
wherein the members are rotatably connected to each other,
the acting parts are opened and closed in association with opening and closing of the grasping parts,
the grasping part has a plurality of grasping positions, and
the grasping part is formed in such a shape that, when the two members are closed at the respective grasping positions, a degree of opening of the acting parts is different among the grasping positions,
wherein a shape of the grasping part is a step shape which is formed to have different widths.

2. The gripping tool according to claim 1, wherein on each of the step shapes, a value indicating a degree of opening of the acting parts is displayed.

3. The gripping tool according to claim 1, wherein the gripping tool further comprises a connection part which connects the acting part and the grasping part, wherein a length of the connection part is adjustable.

* * * * *